United States Patent
Sakurai et al.

(10) Patent No.: US 8,074,100 B2
(45) Date of Patent: Dec. 6, 2011

(54) METHOD AND APPARATUS FOR RESTORE MANAGEMENT

(75) Inventors: Hideki Sakurai, Kawasaki (JP); Yasuo Noguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 173 days.

(21) Appl. No.: 12/414,499

(22) Filed: Mar. 30, 2009

(65) Prior Publication Data

US 2009/0249118 A1    Oct. 1, 2009

(30) Foreign Application Priority Data

Mar. 31, 2008    (JP) ................................. 2008-091038

(51) Int. Cl.
*G06F 11/00*    (2006.01)
(52) U.S. Cl. ........................ 714/5.1; 714/6.31
(58) Field of Classification Search ................ 714/7, 6, 714/5, 6.32, 5.1, 6.1, 6.31; 707/674
See application file for complete search history.

(56) References Cited

U.S. PATENT DOCUMENTS

| | | | | |
|---|---|---|---|---|
| 5,790,773 A * | 8/1998 | DeKoning et al. | ................ | 714/6 |
| 6,745,304 B2 * | 6/2004 | Playe | ................ | 711/161 |
| 6,952,794 B2 * | 10/2005 | Lu | ................ | 714/7 |
| 7,222,257 B1 * | 5/2007 | Dibb | ................ | 714/6 |
| 7,266,718 B2 * | 9/2007 | Idei et al. | ................ | 714/6 |
| 7,293,193 B2 * | 11/2007 | Tanaka et al. | ................ | 714/7 |
| 7,370,248 B2 * | 5/2008 | Tapper et al. | ................ | 714/718 |
| 7,434,097 B2 * | 10/2008 | Guha et al. | ................ | 714/7 |
| 7,565,575 B2 * | 7/2009 | Vingralek | ................ | 714/7 |
| 7,574,623 B1 * | 8/2009 | Goel et al. | ................ | 714/7 |
| 7,620,843 B2 * | 11/2009 | Zohar et al. | ................ | 714/6 |
| 2003/0115409 A1 | 6/2003 | Yamada | | |
| 2003/0177324 A1 * | 9/2003 | Timpanaro-Perrotta | ...... | 711/162 |
| 2005/0102552 A1 * | 5/2005 | Horn | ................ | 714/6 |
| 2005/0193248 A1 | 9/2005 | Idei | | |
| 2005/0246385 A1 | 11/2005 | Nishino et al. | | |
| 2005/0262385 A1 * | 11/2005 | McNeill et al. | ................ | 714/5 |
| 2006/0236149 A1 * | 10/2006 | Nguyen et al. | ................ | 714/6 |
| 2007/0101187 A1 * | 5/2007 | Daikokuya et al. | ................ | 714/6 |

FOREIGN PATENT DOCUMENTS

| | | |
|---|---|---|
| JP | 2880000 B | 1/1999 |
| JP | 2003-141813 A | 5/2003 |
| JP | 2005-242403 A | 9/2005 |
| JP | 2005-316624 A | 11/2005 |

OTHER PUBLICATIONS

JPO, Office Action mailed on Feb. 23, 2010, by the Japan Patent Office in connection with JP Application No. 2008-091038, a foreign correspondent to the instant application. Partial English-language translation provided.

* cited by examiner

*Primary Examiner* — Yolanda L Wilson
(74) *Attorney, Agent, or Firm* — Fujitsu Patent Center

(57) ABSTRACT

A restore management apparatus comprising a restore performing unit which performs restoration of a data and stores the data in a restore disk which is distinct from a backed up disk, a management unit that manages progress of the restoration performed by the restore performing unit, and an access controlling unit that references the progress of the restoration managed by the management unit, makes the restore performing unit preferentially perform the restoration of data that includes a region where the restoration is not completed in response to a data access request to the region, and accesses the region of the restore disk after the restoration is completed.

6 Claims, 8 Drawing Sheets

FIG. 8A

| ADDRESS | RESTORED |
|---|---|
| ADR1 | no |
| ADR2 | no |
| ADR3 | no |
| . . | . . |
| ADR(i) | no |
| . . | . . |
| ADR(n) | no |

112a TABLE

FIG. 8B

| ADDRESS | RESTORED |
|---|---|
| ADR1 | yes |
| ADR2 | yes |
| ADR3 | no |
| . . | . . |
| ADR(i) | no |
| . . | . . |
| ADR(n) | no |

112a TABLE

FIG. 8C

| ADDRESS | RESTORED |
|---|---|
| ADR1 | yes |
| ADR2 | yes |
| ADR3 | no |
| . . | . . |
| ADR(i) | yes |
| . . | . . |
| ADR(n) | no |

112a TABLE

METHOD AND APPARATUS FOR RESTORE MANAGEMENT

CROSS-REFERENCE TO RELATED APPLICATIONS

This application is related to and claims priority to Japanese patent application no. 2008-91038 filed on Mar. 31, 2008 in the Japan Patent Office, and incorporated by reference herein.

FIELD

The present embodiment relates to a method and an apparatus for restore management and, in particular, to a method and an apparatus for restore management that makes a computer perform restoration of data stored in a backed up disk.

BACKGROUND

A restore method is known which restores a system, a disk, or a database in which a failure has occurred.

When restoration is performed via a network, it is time-consuming, and a business operation cannot recover until the restoration is completed.

Thus, a method is known which fixes/restores data content of a system to a reserved disk without stopping the system.

A method is also known which manages the status of a copy operation by using a table and accesses data without stopping the system.

However, in the above-described method, for example, since a data access method is changed by referencing boundary information that indicates the end position of the storage region where data storing is completed, it is not possible to directly update or reference data in the region of the reserved disk where restoration is not completed. Therefore, there is a problem that the same region must be re-restored later.

SUMMARY

According to an aspect of the invention, a restore management apparatus comprising a restore performing unit which performs restoration of a data and stores the data in a restore disk which is distinct from a backed up disk, a management unit which manages progress of the restoration performed by the restore performing unit, and an access controlling unit which references the progress of the restoration managed by the management unit, makes the restore performing unit preferentially perform the restoration of data that includes a region where the restoration is not completed in response to a data access request to the region, and accesses the region of the restore disk after the restoration is completed.

Other features and advantages of embodiments of the invention are apparent from the detailed specification and, thus, are intended to fall within the scope of the appended claims. Further, because numerous modifications and changes will be apparent to those skilled in the art based on the description herein, it is not desired to limit the embodiments of the invention to the exact construction and operation illustrated and described, and accordingly all suitable modifications and equivalents are included.

BRIEF DESCRIPTION OF DRAWINGS

FIG. 8 illustrates a transition of the table.

DESCRIPTION OF EMBODIMENT

The present embodiment will now be described in detail with reference to the accompanying drawings.

An outline will be described first, and then an embodiment will be described.

Figure 1:
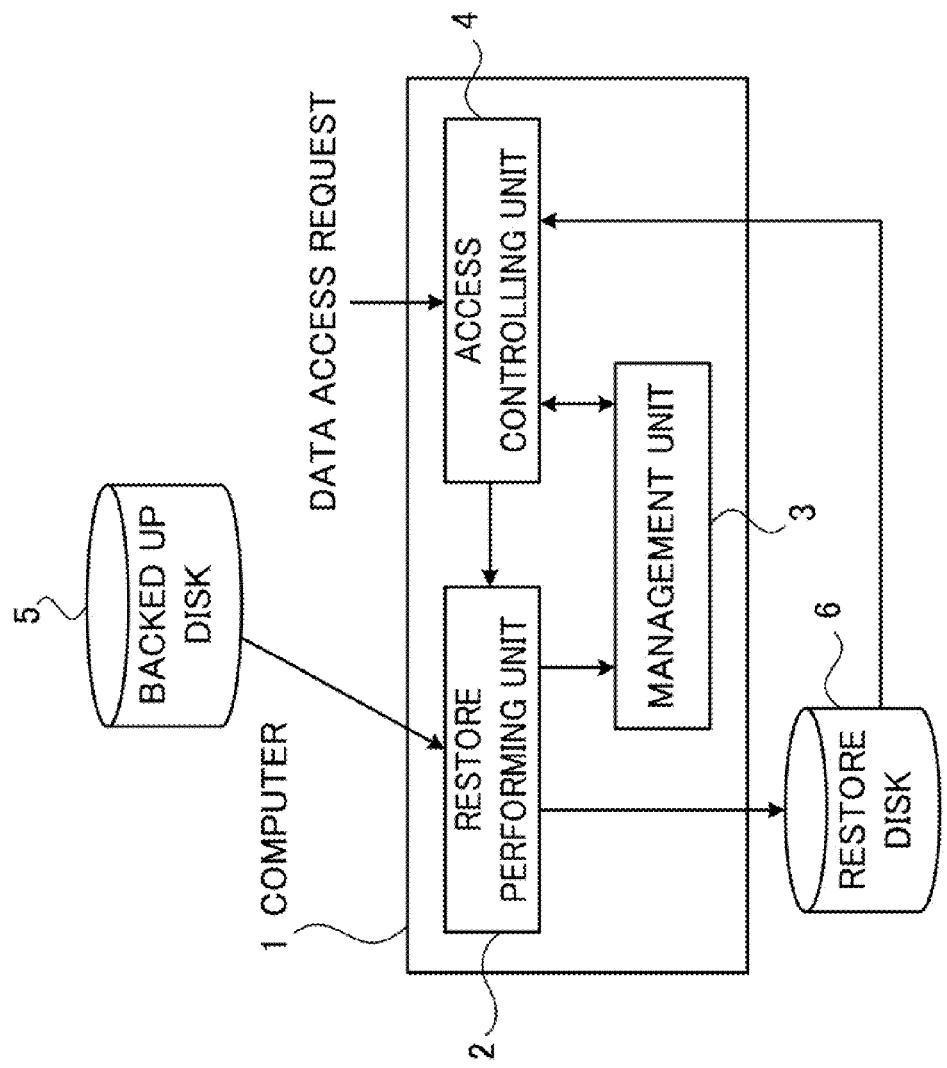
FIG. 1 illustrates an outline of the present embodiment.

FIG. 1 illustrates an outline of the present embodiment.

A computer 1 acts as restore performing unit 2, management unit 3, and access controlling unit 4.

The restore performing unit 2 performs restoration of data stored in a backed up disk 5 and stores that data in a restore disk 6 which is distinct from the backed up disk 5.

The management unit 3 manages the progress of restoration performed by the restore performing unit 2. This progress is managed, for example, in units of processing with which the restore performing unit 2 performs restoration.

The access controlling unit 4 references the progress of the restoration managed by the management unit 3, makes the restore performing unit 2 preferentially perform restoration of data that includes the region where the restoration is not completed in response to a data access request to that region, and accesses that region of the restore disk 6 after the restoration has been completed.

According to such a restore management program, when a data access request to the region where restoration is not completed is made to the access controlling unit 4, restoration of data that includes that region is performed prior to restoring other data by the restore performing unit 2. By accessing the region where restoration is completed, the access controlling unit 4 can respond to a data access request even when restoration is being performed by the restore performing unit 2.

The present embodiment will now be described.

Figure 2:
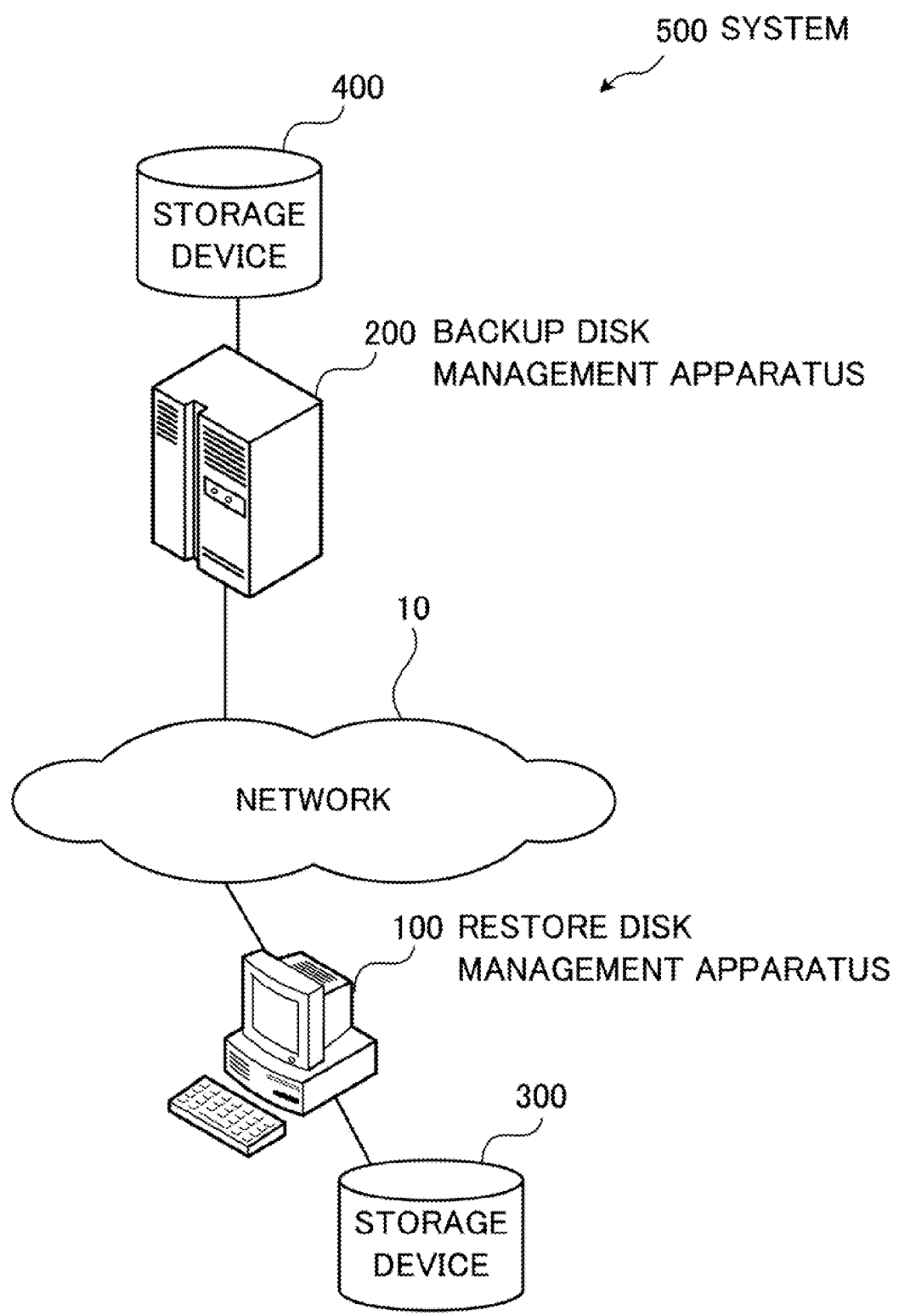
FIG. 2 illustrates a configuration of a system.

FIG. 2 illustrates a configuration of a system.

A system 500 includes a restore disk management apparatus 100 and a backup disk management apparatus 200 that are connected via a network 10.

A storage device 300 (referred to as a "restore disk 300" hereinafter) is connected to the restore disk management apparatus 100.

Also, a storage device 400 (referred to as a "backed up disk 400"hereinafter) is connected to the backup disk management apparatus 200.

The backed up disk 400 stores data in units of a slice (a specific data block unit). One slice may be about 1 GB (gigabyte), for example.

The restore disk management apparatus 100 performs restoration of slices in the backed up disk 400 in response to a request from the backup disk management apparatus 200.

In order to perform restoration, the restore disk management apparatus 100 has the following hardware configuration.

Figure 3:
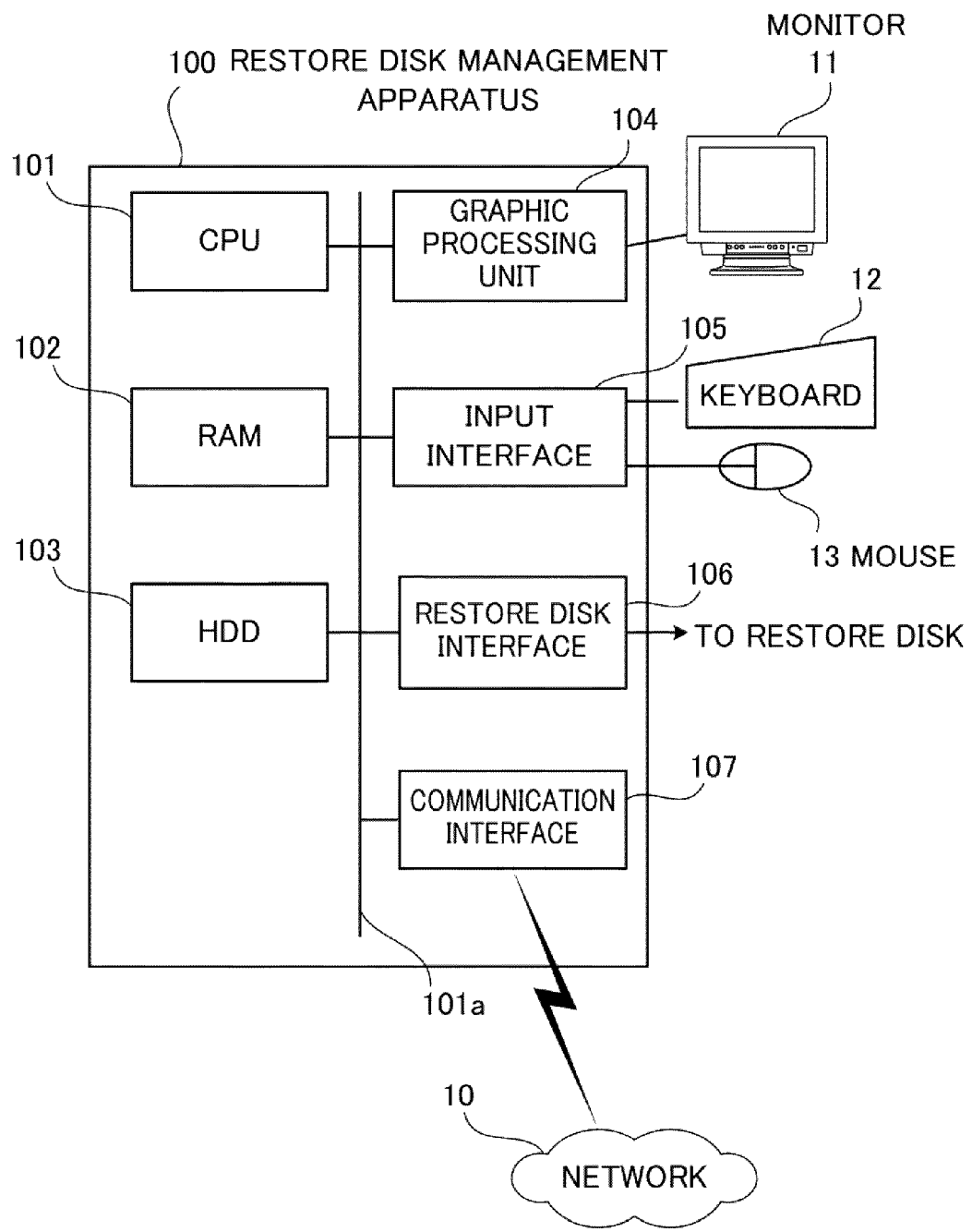
FIG. 3 illustrates an example of a hardware configuration of a restore disk management apparatus.

FIG. 3 illustrates an example of a hardware configuration of the restore disk management apparatus.

The restore disk management apparatus 100 is controlled by a CPU (Central Processing Unit) 101. A RAM (Random Access Memory) 102, an HDD (Hard Disk Drive) 103, a graphic processing unit 104, an input interface 105, a restore disk interface 106, and a communication interface 107 are connected via a bus 101*a* to the CPU 101.

The RAM 102 temporarily stores at least part of an OS (Operating System) program and an application program executed by the CPU 101. The RAM 102 also stores various kinds of data that are needed for processing by the CPU 101. The HDD 103 stores an OS and an application program.

A monitor 11 is connected to the graphic processing unit 104. The graphic processing unit 104 allows images to be displayed on a display of the monitor 11 according to instructions from the CPU 101. A keyboard 12 and a mouse 13 are connected to the input interface 105. The input interface 105 sends signals sent from the keyboard 12 and the mouse 13 to the CPU 101 via the bus 101*a*.

The restore disk interface 106 is connected to the restore disk 300. The restore disk interface 106 inputs and outputs data to the restore disk 300 according to instructions from the CPU 101.

The communication interface 107 is connected to the network 10. The communication interface 107 sends and receives data to and from the backup disk management apparatus 200 via the network 10.

By the above-described hardware configuration, processing functions of the present embodiment may be achieved.

Figure 4:
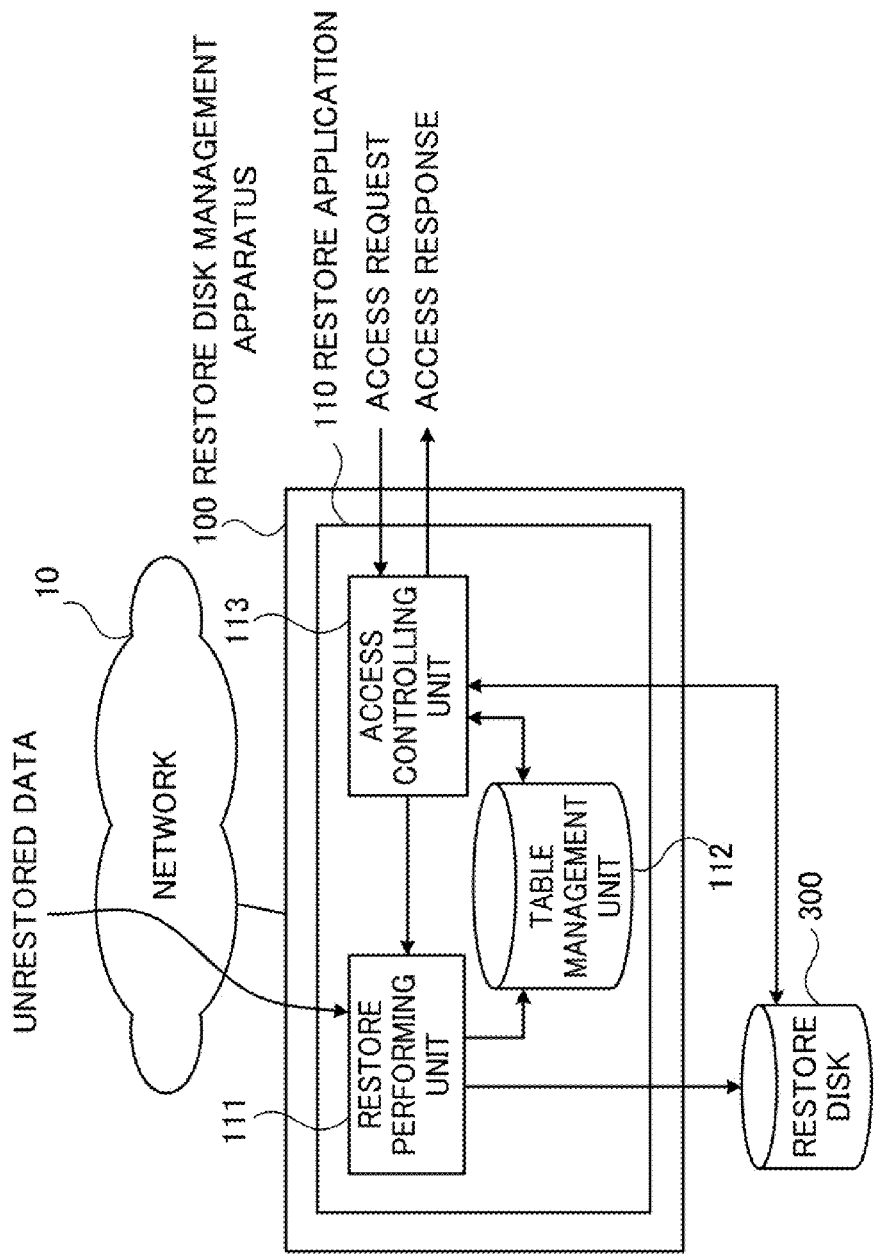
FIG. 4 is a block diagram illustrating functions of the restore disk management apparatus.

FIG. 4 is a block diagram illustrating functions of the restore disk management apparatus.

The restore disk management apparatus 100 includes a restore application 110 that has a restore performing portion 111, a table management portion 112, and an access controlling portion 113.

The restore performing portion 111 acquires, during restoration, data to be restored (referred to as an "unrestored data" hereinafter) sequentially from the slices of the backed up disk 400 starting from the slice that is closest to the leading end of the disk space of the backed up disk 400, and stores the unrestored data in the restore disk 300.

Also, upon receiving a restore request from the access controlling portion 113 that indicates that a data access (either read access or write access) request to the region where restoration is not completed has been made, the restore performing portion 111 performs restoration of the slice that includes the requested data prior to restoring any other slices. This process will be described later.

The table management portion 112 has a table that manages information about the progress of restoration on a slice basis during restoration.

The access controlling portion 113 determines, in response to an access request to the address specified from the outside (or inside) of the restore disk management apparatus 100 (referred to as an "accessing source" hereinafter), whether the data at the specified address exists on the restore disk 300.

If the data at the specified address exists on the restore disk 300, a process according to the content of the access request is performed. Specifically, if the request is a read access request, the data at the specified address is retrieved from the restore disk 300 and transferred to the accessing source. If the request is a write access request, the data to be written is written to the restore disk 300 at the specified address.

Such data may also be written to a log disk (not shown).

On the other hand, if the data at the specified address does not exist on the restore disk 300, a restore request is output to the restore performing portion 111 to make the restore performing portion 111 restore the slice that includes that data to the restore disk 300 before the above-described process is performed.

The table stored in the table management portion 112 will now be described.

Figure 5:
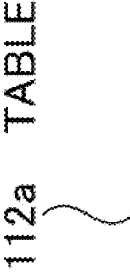
FIG. 5 illustrates a data structure of a table stored in a table management portion.

FIG. 5 illustrates a data structure of the table stored in the table management portion.

A table 112*a* has an "Address" column and a "Restored" column, and information contained in the same row in each column is mutually related.

The Address column contains addresses at the leading end of each slice.

The Restored column contains information that indicates whether restoration of a given slice is completed or not. "Yes" means that restoration is completed, and "no" means that restoration is not completed yet.

The process of the restore performing portion 111 during restoration will now be described.

Figure 6:
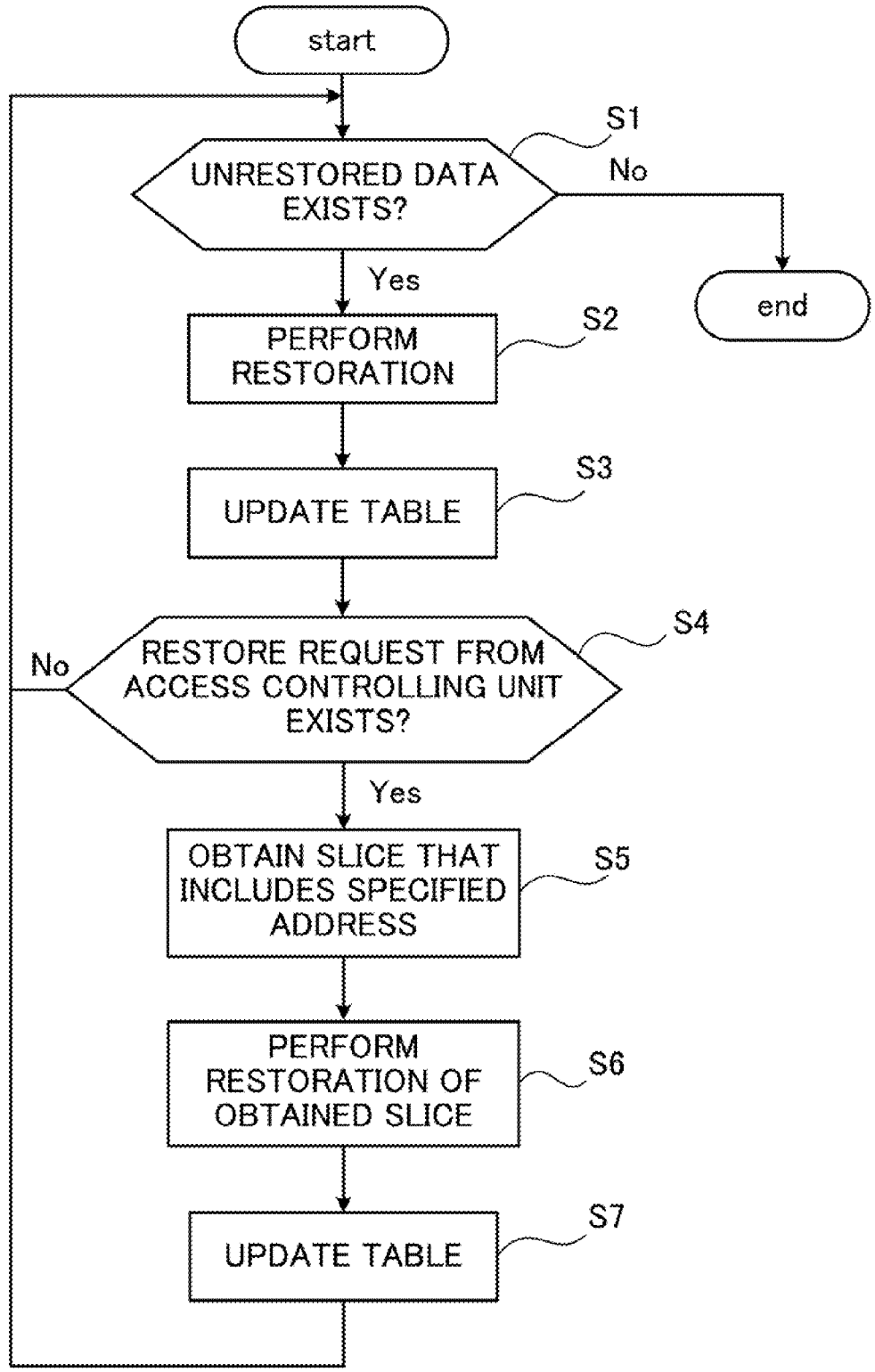
FIG. 6 is a flow chart illustrating a process of a restore performing portion.

FIG. 6 is a flow chart illustrating the process of the restore performing portion.

First, the table 112*a* is referenced to determine whether unrestored data exists or not on the backed up disk 400 (step S1).

If unrestored data does not exist, in other words, if all of the data on the backed up disk 400 is restored (No in step S1), the process is terminated.

If unrestored data exists (Yes in step S1), restoration is performed on the slice that has the smallest address (or is closest to the leading end of the disk space of the backed up disk 400) among those slices that have "no" in the Restored column in the table 112*a* (step S2).

Next, the Restored column in the table 112*a* for the slice that was restored in step S2 is changed from "no" to "yes" (step S3).

It is then determined whether a restore request from the access controlling portion 113 exists or not (step S4).

If such a restore request does not exist (No in step S4), the process goes to step S1 and repeats the process from step S1. This allows sequential restoration of the slices starting from the slice that is closest to the leading end of the disk space of the backed up disk 400.

On the other hand, if such a restore request exists (Yes in step S4), the slice that includes the address of the data that was requested to be restored from the access controlling portion 113 is obtained from the backed up disk 400 (step S5).

Next, restoration of the obtained slice is performed (step S6).

Next, the Restored column of the slice that was restored at step S6 is changed from "no" to "yes" (step S7). The process then goes to step S1 and repeats the process from step S1.

The process of the access controlling portion 113 will now be described.

Figure 7:
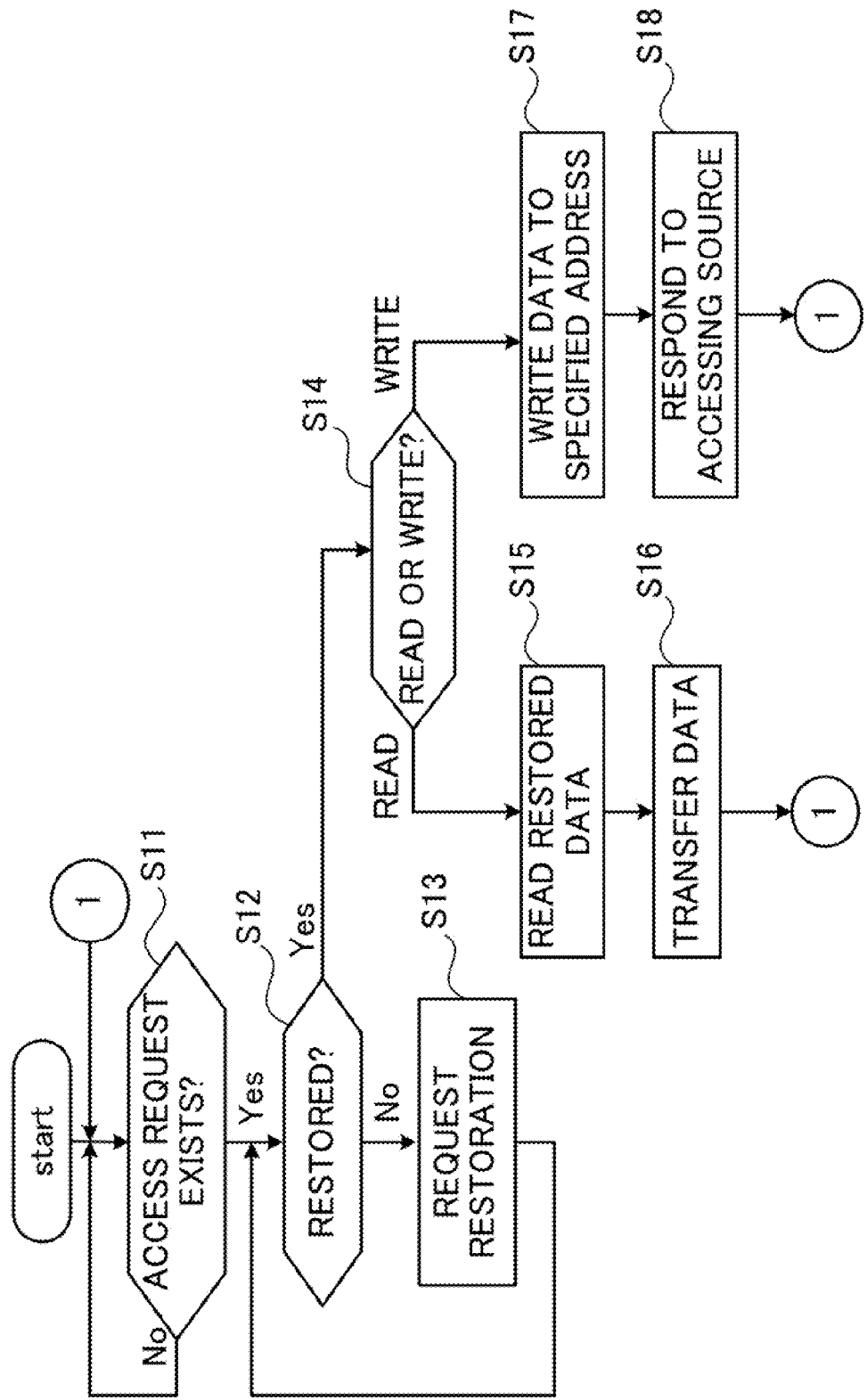
FIG. 7 is a flow chart illustrating a process of an access controlling portion.

FIG. 7 is a flow chart illustrating the process of the access controlling portion.

First, it is determined whether an access request from an accessing source exists or not (step S11).

If an access request does not exist (No in step S11), the process waits for an access request.

If an access request exists (Yes in step S11), the table 112*a* is referenced to determine whether the slice that includes the specified address of the data of that access request is restored or not (step S12).

If not all of the slices are restored (No in step S12), a restore request for the slice that includes the specified address is output to the restore performing portion 111 (step S13).

If a plurality of specified addresses exist, restore requests for all the slices that include the specified addresses are output.

The process waits for the completion of restoration performed by the restore performing portion 111 for a specific time period. The process then goes to step S12 and continues from step S12.

On the other hand, at step S12, if the slice that includes the specified address of the data of the access request is determined to be restored, or is restored by the restore performing portion 111 (Yes in step S12), whether the access request is a read access request or a write access request is determined (step S14).

If the access request is a read access request (READ in step S14), data at the specified address is read from the restore disk 300 (step S15).

The read data is then transferred to the accessing source (step S16). The process then goes to step S11 and repeats the process from step S11.

On the other hand, if the access request is a write access request (WRITE in step S14), data is written to the restore disk 300 at the specified address (step S17).

Next, a write complete notification is sent back to the accessing source (step S18). The process then goes to step S11 and repeats the process from step S11.

FIG. 8 illustrates a transition of the table.

At the start of restoration, all of the information in the Restored column is "no", as shown in FIG. 8(A).

When restoration begins, the restore performing portion 111 sequentially performs restoration from the smallest address number and rewrites the information in the Restored column to "yes", as shown in FIG. 8(B).

If an access request for data that exists in the slice whose leading-end address is ADR(i) is made, the restore performing portion 111 restores the slice whose leading-end address is ADR(i) prior to restoring the slice whose leading-end address is ADR3 and, as shown in FIG. 8(C), rewrites the information in the Restored column of the slice whose leading-end address is ADR(i) to "yes" prior to rewriting the information in the Restored column of the slice whose leading-end address is ADR3.

After that, the restore performing portion 111 restores the slice whose leading-end address is ADR3 as before if no other restore request exists. If any other restore request exists, the restore performing portion 111 restores the slice that includes the requested data.

As described above, according to the system 500, since the restore performing portion 111 performs, in response to a restore request from the access controlling portion 113, restoration of the requested slice prior to any other slices and stores the data of that slice in the restore disk 300, the access controlling portion 113 can access the restore disk 300 even when restoration is being performed, thereby increasing the efficiency of the process.

Although in the present embodiment, if an access request is a read access request, the access controlling portion 113 waits for update of the table 112a and, after the Restored column is updated from "no" to "yes", accesses the restore disk 300 to read data, the present invention is not restricted to this and the restore performing portion 111 may send the restored data to the access controlling portion 113 directly.

Also, in the present embodiment, if an access request is a read access request, the access controlling portion 113 waits for the update of the table 112a and, after the Restored column is updated from "no" to "yes", accesses the restore disk 300 to read data even when the access controlling portion 113 reads data. However, the present invention is not restricted to this and the access controlling portion 113 may access the backed up disk 400 to read data when the Restored column is "no".

While the description has been done based on the embodiment illustrated in the accompanying drawings, the present embodiment is not restricted thereto, and the configuration of each portion may be replaced with any configuration that has similar functionality. Also, the present embodiment may include any other component or process.

The present embodiment also may be a combination of any two or more configurations (features) of the above-described embodiment.

The above-described processing functions may be achieved by a computer. In that case, a program that describes the processing details of the functions that the restore disk management apparatus 100 may have is provided. The above-described processing functions are achieved on the computer by a computer running such a program. The program that describes the processing details may be recorded in a computer-readable recording media. The computer-readable recording media includes, for example, a magnetic recording device, an optical disk, a magneto-optical recording media, and a semiconductor memory. The magnetic recording device includes, for example, a hard disk device (HDD), a flexible disk (FD), and a magnetic tape. The optical disk includes, for example, a DVD (Digital Versatile Disk), a DVD-RAM (Random Access Memory), a CD-ROM (Compact Disk Read Only Memory), and a CD-R (Recordable)/RW (ReWritable). The magneto-optical recording media includes, for example, an MO (Magneto-Optical disk).

When the program is distributed, transportable recording media such as DVDs or CD-ROMs in which the program is recorded may be sold, for example. The program may also be stored in a memory device of a server computer and transferred from the server computer to other computers via a network.

A computer that runs a restore management program stores, in a memory device thereof, the program that is recorded in a transportable recording media or transferred from a server computer. The computer then reads the program from the memory device thereof and performs processing according to the program. The computer may also read the program directly from the transportable recording media and perform processing according to the program. Furthermore, the computer may sequentially perform processing according to the program as the computer receives the program transferred from the server computer.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A computer-readable recording medium that includes a restore management program that, when executed by a processor, instructs a computer to perform a method of restoring data stored in a backed up disk, the method comprising:

restoring, by a restore performing unit that performs restoration in units of data blocks, the data which is stored in plural slices of the backed up disk;

storing, by the restore performing unit, the data into plural slices of a restore disk which is distinct from the backed up disk;

managing, by a management unit, the progress of the restoration performed by the restore performing unit in the units of data blocks; and controlling, by an access controlling unit that references the progress of the restoration managed by the management unit, the restore performing unit to restore the units of data blocks sequentially starting from a data block with a smallest address number, to change the order of restoration to interrupt the restoring according to the address number, and to preferentially restore the data stored in one of the plural slices of the backed up disk, which includes a region where the restoration is not completed, in response to a data access request to the region.

2. The computer-readable recording medium according to claim 1, wherein
the access controlling unit determines whether the restoration is completed or not in the units of data blocks.

3. A computer-implemented restore management method, performed by a processor, that instructs a computer to perform restoration of data stored in a backed up disk, the method comprising:

restoring, in units of data blocks, the data which is stored in plural slices of the backed up disk;

storing the data into plural slices of a restore disk which is distinct from the backed up disk;

managing the progress of the restoration of the data which is stored in plural slices of the backed up disk; and controlling the progress of the restoration to restore the units of data blocks sequentially starting from a data block with a smallest address number, to change the order of restoration to interrupt the restoring according to the address number, and to preferentially restore the data stored in one of the plural slices of the backed up disk, which includes a region where the restoration is not completed, in response to a data access request to the region.

4. The computer-implemented restore management method according to claim 3, wherein
the controlling determines whether the restoration is completed or not in the units of data blocks.

5. A restore management apparatus comprising:

a restore performing unit that performs, in units of data blocks, restoration of data which is stored in plural slices of a backed up disk and stores the data into plural slices of a restore disk which is distinct from the backed up disk;

a management unit that manages a progress of the restoration performed by the restore performing unit in the units of data blocks; and an access controlling unit that references the progress of the restoration managed by the management unit, and makes the restore performing unit restore the units of data blocks sequentially starting from a data block with a smallest address number, change the order of restoration to interrupt the restoring according to the address number, and preferentially perform the restoration of data stored in one of the plural slices of the backed up disk, which includes a region where the restoration is not completed, in response to a data access request to the region.

6. The restore management apparatus according to claim 5, wherein
the access controlling unit determines whether the restoration is completed or not in the units of data blocks.

* * * * *